(12) United States Patent
Huignard et al.

(10) Patent No.: US 8,767,289 B2
(45) Date of Patent: Jul. 1, 2014

(54) LASER DEVICE COMPRISING MEANS FOR CONTROLLING THE PHASE OF A LARGE NUMBER OF COHERENT SOURCES

(75) Inventors: Jean-Pierre Huignard, Paris (FR); Cindy Bellanger, Savigny sur Orge (FR); Arnaud Brignon, Bourg la Reine (FR); Joseph Colineau, Bures sur Yvette (FR)

(73) Assignee: Thales, Neuilly sur Seine (FR)

( * ) Notice: Subject to any disclaimer, the term of this patent is extended or adjusted under 35 U.S.C. 154(b) by 947 days.

(21) Appl. No.: 12/487,504

(22) Filed: Jun. 18, 2009

(65) Prior Publication Data

US 2009/0316734 A1    Dec. 24, 2009

(30) Foreign Application Priority Data

Jun. 20, 2008   (FR) .................................... 08 03461

(51) Int. Cl.
*H04B 10/17*   (2006.01)
(52) U.S. Cl.
USPC ..................................... 359/341.4; 359/349
(58) Field of Classification Search
USPC .................................... 359/341.1, 341.4, 349
See application file for complete search history.

(56) References Cited

U.S. PATENT DOCUMENTS

| | | | | |
|---|---|---|---|---|
| 5,454,004 | A * | 9/1995 | Leger | 372/99 |
| 5,805,759 | A * | 9/1998 | Fukushima | 385/140 |
| 5,994,687 | A * | 11/1999 | Chanteloup et al. | 250/201.9 |
| 6,061,170 | A | 5/2000 | Rice et al. | |
| 6,366,356 | B1 * | 4/2002 | Brosnan et al. | 356/477 |
| 2002/0164069 | A1 * | 11/2002 | Nagano et al. | 382/154 |
| 2004/0233940 | A1 | 11/2004 | Huignard et al. | |
| 2007/0052969 | A1 | 3/2007 | Huignard et al. | |
| 2007/0201795 | A1 * | 8/2007 | Rice et al. | 385/39 |
| 2008/0055700 | A1 | 3/2008 | Bourderionnet et al. | |
| 2009/0201575 | A1 * | 8/2009 | Fermann et al. | 359/341.32 |

FOREIGN PATENT DOCUMENTS

WO    WO 03/055016 A2 *  7/2003  ............. H01S 3/067

OTHER PUBLICATIONS

Bellanger et al., "Coherent fiber combining by digital holography", Optics Letters, vol. 33, No. 24, pp. 2937-2939 (Dec. 15, 2008).*
U.S. Appl. No. 12/063,619, filed Mar. 10, 2006, Sebastien Demoustier, et al.

(Continued)

*Primary Examiner* — Eric Bolda
(74) *Attorney, Agent, or Firm* — LaRiviere, Grubman & Payne, LLP

(57) ABSTRACT

The invention relates to a laser device comprising a number of fiber amplifiers (3) delivering a number of optical waves, which is supplied by an oscillator (1) that delivers a signal wave, characterized in that said device comprises:
  a coherent source (4) emitting a coherent wave at a wavelength approximately equal to that of the signal wave and the propagation direction of which is inclined to the propagation direction of the optical waves output by the fiber amplifiers;
  means for making the coherent wave interfere with the optical waves output by the fiber amplifiers, and generating an interferogram consisting of an array of fringes;
  interferogram detection means (7), the relative positions of the fringes transcribing an inter-fiber phase law;
  a spatial phase modulator (2); and
  processing/display means (6) for processing the detected phase law and for displaying it on the spatial modulator, said spatial modulator being positioned so as to be able to be read by the signal wave and thus generate a phase-modulated signal wave selectively at each of the fiber amplifiers, compensating for the phase shifts induced by said fiber amplifiers.

12 Claims, 2 Drawing Sheets

(56) References Cited

OTHER PUBLICATIONS

U.S. Appl. No. 12/301,063, filed Mar. 25, 2007, Simon Richard, et al.
Desfarges-Berthelemot et al., "Coherent Combining of Fibre Lasers", Comptes Rendus-Physique, Mar. 1, 2006, pp. 244-253, vol. 7, No. 2, Paris, France.
Fan T Y, "Laser Beam Combining for High-Power", IEEE Journal of Selected Topics in Quantum Electronics, May 1, 2005, pp. 567-577, vol. 11, No. 3, Piscataway, New Jersey.
Bourdon P et al., "Coherent Beam Combining of Fiber Amplifier Arrays and Application to Laser Beam Propagation Through Turbulent Atomsphere", Proceedings of Spie, Jan. 24.

* cited by examiner

LASER DEVICE COMPRISING MEANS FOR CONTROLLING THE PHASE OF A LARGE NUMBER OF COHERENT SOURCES

PRIORITY CLAIM

This application claims priority to French Patent Application Number 08 03461, entitled Laser Device Comprising Means for Controlling the Phase of a Large Number of Coherent Sources, filed on Jun. 20, 2008.

BACKGROUND OF THE INVENTION

The field of the invention is that of high-power laser sources using an array of fibre lasers, capable of delivering a significant gain in extracted energy. Increasing the power, and in particular the energy, of fibre lasers constitutes a major challenge in many industrial, scientific (metrology, lidar, etc.) and optronic applications.

One of the limiting factors as regards the power generated as output by a fibre amplifier is the small core diameter of the fibre, whenever this is a single-mode fibre, and leads to the appearance of non-linear effects and/or a damage threshold in fibre amplifiers.

Two research approaches are currently being explored in laboratories, with the aim of paralleling a linear or matrix array of N or $N^2$ fibre amplifiers by means of the following two techniques.

These are wavelengths multiplexing and coherent phase control of the fibre amplifiers, therefore constituting the equivalent of a phase array, using individual unit phase modulators coupled to each of the fibre amplifiers.

However, for a very large number of fibre amplifiers (typically greater than 100), the solution of wavelength recombination has limits, and especially in terms of spectral control.

SUMMARY OF THE INVENTION

Within this context, the present invention provides a high-power laser source using a collective coherent phase-control technique compatible with a large number of fibre amplifiers constituting a fibre array.

More precisely, the subject of the present invention is a laser device comprising a number of fibre amplifiers delivering a number of optical waves, which is supplied by an oscillator that delivers a signal wave, characterized in that said device comprises:
  a coherent source emitting a coherent wave at a wavelength approximately equal to that of the signal wave and the propagation direction of which is inclined to the propagation direction of the optical waves output by the fibre amplifiers;
  means for making the coherent wave interfere with the optical waves output by the fibre amplifiers, and generating an interferogram consisting of an array of fringes;
  interferogram detection means, the relative positions of the fringes transcribing an inter-fibre phase law;
  a spatial modulator; and
  processing/display means for processing the detected phase law and for displaying it on the spatial modulator, said spatial modulator being positioned so as to be able to be read by the signal wave and thus generate a phase-modulated signal wave selectively at each of the fibre amplifiers, compensating for the phase shifts induced by said fibre amplifiers.

Thus, coherent addition makes it possible to produce a one-dimensional or two-dimensional phase array of N or $N^2$ fibre amplifiers, providing both a high emitted power equal to N or $N^2$ times the power of an elementary fibre amplifier, and a source brightness corresponding to the overall size of the emissive pupil constituting the array.

According to one embodiment of the invention, the detection means comprise a detection matrix of the CCD (charge coupled device) type or of the FET (field effect transistor) or CMOS (complementary metal oxide semiconductor) detector type.

According to one embodiment of the invention, the number of pixels in the matrix ranges from about a few $10^6$ to a few $10^7$ pixels, this being compatible with an image of high spatial resolution.

According to one embodiment of the invention, the spatial phase modulator is of the LCD (liquid crystal display) type.

According to one embodiment of the invention, the spatial phase modulator has a response time of the order of 10 milliseconds, compatible with an image rate equal to or greather than around 100 Hz.

According to one embodiment of the invention, the means for making said coherent source interfere with the optical beams comprise a mirror.

According to one embodiment of the invention, the fibre amplifiers are provided with collimating lenses of the type comprising arrays of individual microlenses or microlenses arranged in a one-dimensional (1D) or two-dimensional (2D) array.

According to one embodiment of the invention, the fibre amplifiers are polarization-maintaining fibre amplifiers.

According to one embodiment of the invention, the laser device further includes conventional optical beam-shaping components: beam splitter plates having a split-off ratio adapted to the desired function, and fibre connectors.

According to one embodiment of the invention, the device further includes deflection means, the optical axis of which is inclined to the direction of propagation of the waves output by the fibre amplifiers, making it possible to generate, from the signal wave, a signal wave which is correctly oriented and comprises a direction of propagation inclined to the directions of propagation of the waves from the fibre amplifiers.

According to one embodiment of the invention, the angle between the direction of propagation of the waves output by the fibre amplifiers and that of the plane signal wave which interfere with one another is of the order of a few degrees in order to detect each spatial period Λ of the phase law with a sufficient number of pixels.

According to one embodiment of the invention, since the wavelength of the signal wave is around 1 micron to 1.5 microns, each spatial period is detected by about ten pixels and may be around 50 to 100 μm.

According to one embodiment of the invention, the phase-law processing/display means further include frequency filtering means so as to retain only the spatial frequencies corresponding to the interference fringes.

DESCRIPTION OF THE DRAWINGS

The invention will be better understood and other advantages will become apparent on reading the following description, given by way of non-limiting example, and on examining the appended figures in which.

Figure 1:
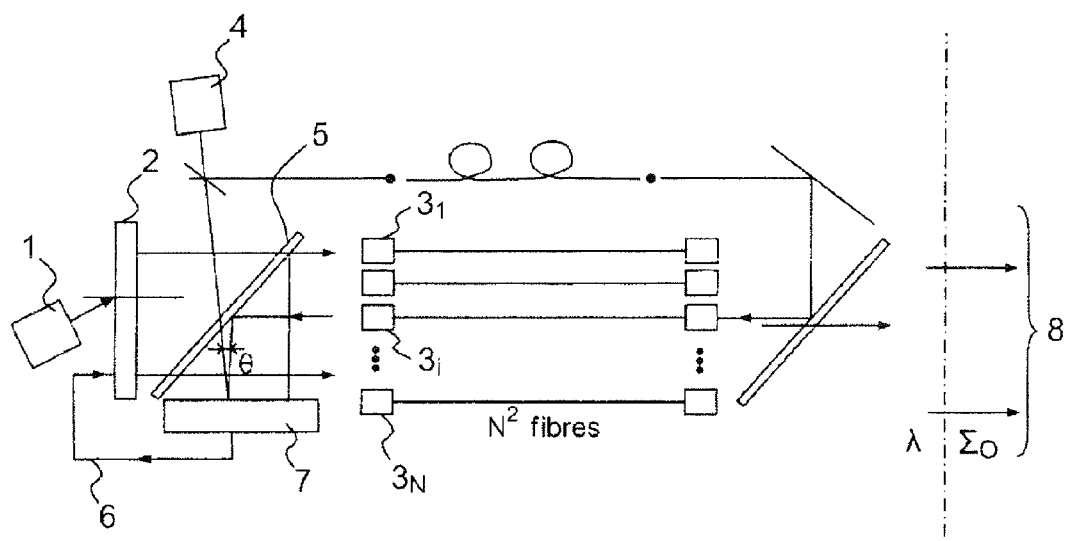
FIG. 1 illustrates a first example of a laser device according to the invention.

The general principle of the present invention lies in the integration of means for controlling the phase of coherent fibre amplifier sources. This principle is illustrated in FIG. 1, which shows a first example of a laser device according to the invention and the relative positioning of the base components of the optical architecture. These components are mainly:

- fibre amplifiers 3 provided with collimating lenses of the following type: Arrays of individual microlenses, or microlenses in a one-dimensional or two-dimensional array. The fibre amplifiers are preferably polarization-maintaining fibre amplifiers;
- a one-dimensional or two-dimensional spatial modulator 2 designed to control the phase of each elementary fibre amplifier. The response time of this spatial modulator of the LCD type must be compatible with an image rate typically equal to or greater than 100 Hz;
- a matrix of CCD or CMOS detectors 7 having a number of pixels compatible with an image of typically high spatial resolution ranging from a few $10^6$ pixels to a few $10^7$ pixels or higher;
- conventional optical beam-shaping components which are not shown; beam splitter plates having a split-off ratio adapted to the desired function, and fibre connectors, etc.; and
- signal processing/display means 6 for controlling the spatial modulator.

DETAILED DESCRIPTION OF THE PREFERRED EMBODIMENTS

The signal wave 1 output by an oscillator (not shown) is fed, via a selectively transparent mirror, to the fibre amplifiers 3, the amplified waves output by said fibre amplifiers being reflected by the mirror 5.

An ancillary coherent source 4 is transmitted through the mirror 5. It has a direction of propagation making an angle θ with the propagation axis of the amplified waves output by the fibre amplifiers so as to be able to interfere with them, a portion of said coherent source being split off so as to probe the array of fibre amplifiers.

The phase of the fibre array may thus be probed by the very-low-power ancillary coherent source 4 having a wavelength approximately equal to that of the oscillator 1, which generates a coherent wave serving for injection into the array of fibre amplifiers.

The relative phase between the fibre amplifiers is detected by interference of a plane reference wave coming from the ancillary coherent source 4 and plane waves output by the fibre amplifiers.

The result of this interference is an array of fringes which have the same period and the relative phase of which is equal to $\phi_i(x)$, detected by a detector 7 and then sent to a one-dimensional or two-dimensional spatial modulator 2.

Figure 2:
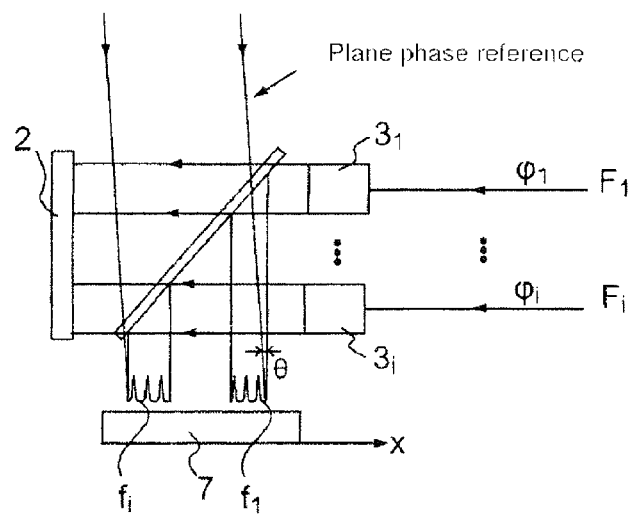
FIG. 2 illustrates the interference between the optical beams output by the fibre amplifiers and the inclined optical beam.

According to this principle shown in detail in FIG. 2, it is the relative positions of the fringes $f_1, \ldots, f_i$ on the detector that determine the phase difference between fibre amplifiers $F_1, \ldots, F_i$. If the phases change, owing to "slow" effects due to temperature, stresses, acoustic noise, etc., the interference is detected in real time at a rate of 100 Hz or higher.

The angle between the propagation direction of the waves output by the fibre amplifiers and that of the plane signal wave which interfere with one another is chosen to be small (typically less than 1°) in order to detect each spatial period Λ (typically around 50 μm) with a sufficient number of pixels, for example less than 10 pixels, corresponding to a 5 μm size of an individual CCD pixel for a value of Λ=50 μm, or 100 μm typically.

The interferogram detected according to the principles shown in FIGS. 1 and 2 is written onto the two-dimensional phase modulator.

Figure 3:
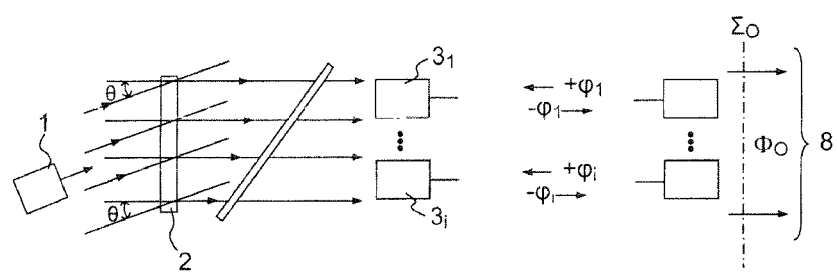
FIG. 3 illustrates the diffraction at the spatial modulator.

The wave output by the oscillator 1 is then spatially modulated and it diffracts, under the read conditions shown in FIG. 3, a wave whose phase at each fibre amplifier is equal to $-\phi_i(x)$. This phase law therefore compensates at each instant for the phase shifts induced by the fibre amplifiers of the two-dimensional array of amplifiers, thus carrying out the phase control function on the resulting wave 8.

More precisely, the spatial phase distribution detected after CCD reading is given by:

$$\Phi(x)=\phi_O+\delta\phi_i \cos [Kx+\phi_i(t)].$$

The phase law written onto the LCD according to the read scheme shown in FIGS. 1 and 2 is given by:

$$\Phi(x)=\phi_O+\delta\phi_i \cos [Kx-\phi_i(t)].$$

After diffraction, it generates a wave, the phase of which is $-\phi_i(x)$.

The oscillator 1 is coupled by diffraction by the liquid crystal spatial modulator onto the array of fibre amplifiers. This function is performed by a spatial modulator display having a resolution equivalent to that of the detection matrix and having, to provide this function, a number of pixels ranging from at least a few $10^6$ to a few $10^7$.

These orders of magnitude are completely compatible with LCD technology displaying HDTV (high-definition television) images at a rate of 100 Hz. This display may be considered to be a diffractive dynamic element within the context of the invention.

The general idea of the proposed phase control in the present invention thus consists in carrying out, in parallel and at a given instant, a measurement of the relative phase between the various fibre amplifiers on the CCD detector, so as thereafter to compensate, in real time, for this relative phase shift effect between fibre amplifiers of the array by diffraction using the LCD phase display, which is small and compatible with the size of the pixel. The detected interferogram is displayed on the spatial modulator as shown in the diagram of FIG. 2. Under these conditions, the spatial phase modulator diffracts a wave, so as to phase-control the entire array of fibre amplifiers.

According to one embodiment of the invention, it is also possible to probe, at the wavelength λ the phase of each amplifier by a very small back-reflection of the wave at the end of each fibre (double passage of the probe beam). The detector receives an interference pattern of the form:

$$I_O(1+\cos [Kx+2\phi_2(t)]).$$

After the signal output by the CCD or CMOS detection matrix has been processed, a diffraction law is displayed on the LCD spatial modulator, this being of the form:

$$\Phi(x)=\phi_O+\delta\phi_i \cos [Kx-\phi_i(t)].$$

This phase law diffracts under conditions identical to those illustrated in FIG. 2 and compensates, in a single pass, for the phase shift $\phi_i(x)$ due to each amplifier.

The invention is particularly well suited within the context of using polarization-maintaining single-mode fibres.

If the fibres are depolarizing, the principles involved and described above are compatible with simultaneous processing of the two polarization components output by a polarization beam splitter.

According to one embodiment of the invention, it may be advantageous to integrate a component of the polarization controller type, making it possible, for each fibre amplifier, to re-establish a linear polarization state suitable for diffraction by the LCD matrix. As described in the patent application filed by the Applicant and published under the number FR 2 907 547 relating to a polarimetric imaging system having a matrix of programmable waveplates based on a material with an isotropic electrooptic tensor, this may be a component corresponding to a programmable means for analysing an incident polarization distribution.

Exemplary embodiments of a laser device according to the invention:

The device comprises a signal wave source, the wave having a wavelength typically of 1 μm or 1.5 μm. The angle θ between the two beams interfering on the detection matrix is of the order of 10 milliradians, leading to a spatial period of the order of 100 μm.

The two-dimensional array of single-mode amplifiers may typically be a 10×10 array which are collimated at each end by microlenses, the beam diameters being of the order of 1 mm to 2 mm. Each elementary beam is collected by about 200 CCD matrix and LCD matrix pixels.

The device may also comprise a matrix of LCOS type, corresponding to a liquid crystal matrix on a silicon substrate and operating in reflection, typically comprising $4 \times 10^6$ pixels.

According to one embodiment of the invention, the phase modulator may also be of the "MOEMS" (micro-opto-electromechanical system) type, simultaneously providing mechanical, electrical and optical functions. Under the effect of an applied electric field and through an electrostatic force, certain unitary elements may be brought close to the substrate, thereby creating an array structure. Typically, these elements may have lengths of about a few tens of microns for widths of about a few microns. Micromirrors capable of reflecting, or not, the light beam are thus produced, said micromirrors being electrically controllable and thereby allowing binary or analogue phase control.

What is obtained is a maximum diffraction efficiency of the phase modulator of about 34% and typically greater than 20% given near IR operation.

The diffraction orders are filtered by the core of each fibre. Control of the emission direction is made possible by introducing a linear phase law superposed on the compensation law.

Figure 4:
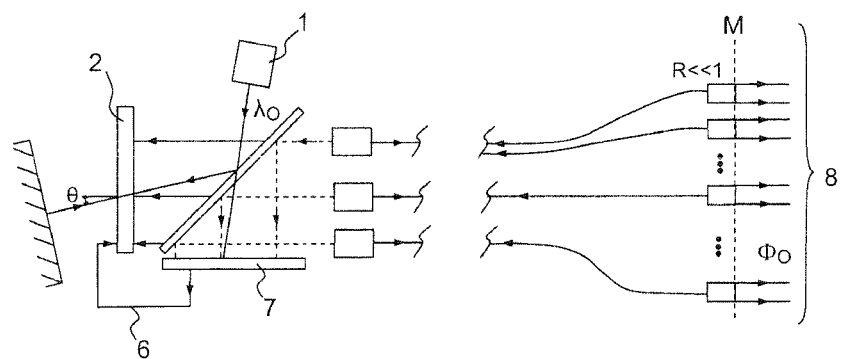
FIG. 4 illustrates an embodiment of a compact laser device according to the invention.

According to one embodiment of the invention illustrated in FIG. 4, the emission pupil may be lacunate, thanks to the presence of fibres distributed relatively densely in space together with local fibre gaps, and a relatively distributed pupil. It is thus possible, using a surface area of about 1 cm² at the exit face of the fibres to create a highly extended source measuring about 1 m² in area without necessarily having need of a large number of fibres constituting the fibre array.

This embodiment is compatible with operation of the source in pulse mode.

It should be noted that, since the wavelength of the probe beam serving for measuring the phase of each fibre may be slightly different from the emission wavelength of the source, it is possible to display, on the phase modulation matrix, a calculated phase law that takes into account this difference in wavelength. Typically, if the coherent source emits at a wavelength λ' close to the wavelength λ corresponding to the wavelength of the oscillator, the phase to be displayed corresponds to the measured phase multiplied by the parameter λ'/λ.

In this method, the signal processing is simple and rapid, or even non-existent, since the interferogram detected by the matrix, for example of the CCD type, which is displayed directly on the phase modulator in order to compensate for the phase differences of the various pupils, is used.

However, the detected signal is corrupted by low-frequency components, due to the lack of uniformity of the beams, as well as other artefacts, often encountered when interference patterns are detected.

It may therefore be useful to apply filtering to the detected signal, making it possible to retain only the spatial frequencies corresponding to the interference fringes. The low-frequency spectral components of the image are eliminated and replaced with an average component chosen so as to best use the dynamic range of the spatial modulator.

In the above device, it is enough just to apply a phase shift to the beam which is the opposite of the one measured. It is therefore what is usually called a "feed-forward" compensation, which takes into account neither the measurement errors (non-planarity of the reference, non-linearities of the detector) nor the defects of the spatial modulator.

However, it is possible for the phase of the detected interferogram to be locally corrected before it is applied to the modulator in order to carry out the compensation. This is performed very simply in the Fourier space, by multiplying the Fourier transform of the detected signal by a complex matrix representing the phase correction to be applied to each sub-pupil. This operation may advantageously be combined with the abovementioned filtering operation, since the two processing steps simply consist of a multiplication in the Fourier transform space.

The phase correction matrix may be generated in an operation to calibrate the multiple-pupil source.

It may also be made to evolve in real time (so as to adapt for example to mechanical deformations, to temperature effects, etc., which would not be taken into account in the direct control described above).

In this case, it is advantageous to provide a device for observing the residual wavefront errors of the multi-pupil source, so as to carry out a feedback operation by modifying the phase correction matrix. The bandwidth of this external loop is chosen according to the time constant of the residual errors.

What is claimed is:

1. Laser device comprising a number of fiber amplifiers delivering a number of optical waves, which are supplied by an oscillator that delivers a signal wave, comprising:
    a. a coherent source mining a coherent wave at a wavelength approximately equal to that of the signal wave and the propagation direction of which is inclined to the propagation direction of the optical waves output by the fiber amplifiers;
    b. a mirror configured to make the coherent wave interfere with the optical waves output by the fiber amplifiers;
    c. a means for generating an interferogram comprising an array of fringes;
    d. an interferogram detection means that identity relative positions of the fringes transcribing an inter-fiber phase law; and wherein the detection means comprise at least one of the following:
        i. as matrix of the CCD type detectors;
        ii. a matrix of CMOS type detectors;
    e. a spatial phase modulator; and
    f. a signal processor and display for processing the detected phase law and for displaying it on the spatial modulator, the spatial modulator positioned to be read by the signal wave and to generate a phase-modulated signal wave selectively at each of the fiber amplifiers, and to compensate for the phase shifts induced by the fiber amplifiers.

2. Laser device according to claim 1, wherein the order of magnitude of pixels m the matrix ranges from $10^6$ to $10^7$ pixels.

3. Laser device according to claim 1, wherein the spatial modulator is of the LCD display type.

4. Laser device according to claim 1, wherein the spatial modulator is based on MOEMS components.

5. Laser device according to claim 1, wherein the spatial modulator has a response time of an order of magnitude of 10 milliseconds, compatible with an image rate typically equal to or greater than 100 Hz.

6. Laser device according to claim 1, wherein the fiber amplifiers comprise collimating lenses of the type comprising arrays of individual microlenses or microlenses arranged in a one-dimensional or two-dimensional array.

7. Laser device according to claim 1, wherein the fiber amplifiers are polarization-maintaining fiber amplifiers.

8. Laser device according to claim 1, further comprising conventional optical beam-shaping components, including beam splitter plates having a split-off ratio adapted to the desired function, and fiber connectors.

9. Laser device according to claim 1, wherein the coherent source is an oscillator, and wherein the device further comprises a deflection means having an optical axis inclined to the direction of the optical beams from the fiber amplifiers, that generate, from the signal wave, the optical beam along a direction inclined to the directions of the optical beams from the fiber amplifiers.

10. Laser device according to claim 1, wherein the angle between the direction of propagation of the waves output by the fiber amplifiers and that of the plane signal wave which interfere with each other is of the order of a few degrees for the purpose of detecting each spatial period $\Lambda$ of the phase-law with a sufficient number of pixels.

11. Laser device according to claim 10, wherein the wavelength of the signal wave is around 1 micron to 1.5 microns, each spatial period, which is around 50 to 100 μm, is detected by about ten pixels.

12. Laser device according to claim 1, wherein the phase-law processing/display means further include frequency filtering means so as to retain only the spatial frequencies corresponding to the interference fringes.

* * * * *

UNITED STATES PATENT AND TRADEMARK OFFICE
CERTIFICATE OF CORRECTION

PATENT NO.         : 8,767,289 B2                      Page 1 of 1
APPLICATION NO.    : 12/487504
DATED              : July 1, 2014
INVENTOR(S)        : Jean-Pierre Huignard et al.

It is certified that error appears in the above-identified patent and that said Letters Patent is hereby corrected as shown below:

In the Claims:
Claim 1, column 6, line 48, delete "mining" and insert --emitting--;
Claim 1, column 6, line 57, delete "identity" and insert --identify--; and
Claim 2, column 7, line 5, delete "m" and insert --in--.

Signed and Sealed this
Thirtieth Day of September, 2014

Michelle K. Lee
*Deputy Director of the United States Patent and Trademark Office*